United States Patent [19]

Rotenberg et al.

[11] 4,229,228

[45] * Oct. 21, 1980

[54] COATING COMPOSITION

[75] Inventors: Don H. Rotenberg, Westboro; Patricia M. Cuffe, Dudley; Bernard L. Laurin, Ludlow; Peter R. Ramirez, Southbridge, all of Mass.

[73] Assignee: American Optical Corporation, Southbridge, Mass.

[*] Notice: The portion of the term of this patent subsequent to Nov. 6, 1996, has been disclaimed.

[21] Appl. No.: 948,595

[22] Filed: Oct. 4, 1978

Related U.S. Application Data

[63] Continuation-in-part of Ser. No. 897,317, Apr. 18, 1978, Pat. No. 4,173,490.

[51] Int. Cl.$^3$ .............................................. C09K 3/00
[52] U.S. Cl. ......................... 106/287.14; 106/287.16; 350/175 R; 528/39
[58] Field of Search .................. 106/287.14, 287.16; 428/412; 528/39; 350/175 R; 351/166

[56] References Cited

U.S. PATENT DOCUMENTS

| | | | |
|---|---|---|---|
| 4,006,271 | 2/1977 | French et al. | 351/166 |
| 4,024,306 | 5/1977 | Takamizawa et al. | 428/412 |

*Primary Examiner*—Theodore Morris
*Attorney, Agent, or Firm*—Jeremiah J. Duggan; Alan H. Spencer; Stephen A. Schneeberger

[57] ABSTRACT

A coating composition which results from hydrolyzing 35 to 70 weight percent tetraethyl orthosilicate and 60 to 20 weight percent of certain silane is useful for providing abrasion resisting coatings for plastics after curing. Optionally, up to 20 weight percent of a silane having a reactive polar site or, in the alternative, a small percentage of a surfactant may be used to provide a dyeable coated article.

3 Claims, No Drawings

COATING COMPOSITION

BACKGROUND OF THE INVENTION

This application is a continuation-in-part of our earlier application Serial No. 897,317, filed April 18, 1978 now U.S. Pat. No. 4,173,490.

This invention relates to Si containing coating compositions and more particularly to coating compositions for polymeric substrates.

PRIOR ART

U.S. Pat. No. 3,894,881 issued July 15, 1975 to Suzuki et al. This patent relates to a coating composition which comprises a mixture of separately hydrolyzed Si containing materials and a metal salt. The patent does not refer to any coating compositions of a similar type which are hydrolyzed as a mixture.

SUMMARY OF THE INVENTION

We have developed an improved type of abrasion-resistant coating based upon siloxane copolymers. These coatings are useful for increasing the abrasion resistance of plastics, especially those used for the manufacture of eyeglass lenses, sunglasses, goggles, and window and architectural glazing. Typical plastic substrates that can be used for these applications are polycarbonate, polymethyl methacrylate, cellulose propionate, cellulose butyrate, and poly diethylene glycol bis(allyl carbonate). Polycarbonate and poly diethylene glycol bis(allyl carbonate) are preferred lens materials.

Lenses can be formed from thermoplastics by molding techniques, from thermosetting plastics by casting techniques, and from both by machining and surfacing processes. Such lenses can be coated with the polysiloxane coating to provide a surface that is more resistant to both abrasion and solvent attack than the uncoated plastic.

While these coatings provide good resistance to both abrasion and solvents, they introduce an additional feature that was not possible before with earlier polysiloxane coatings. The polysiloxane coatings of this invention can be tinted or dyed with organic dyes so that coated lenses can be provided with fashion or sunglass colors in a manner similar to the way uncoated lenses are now currently dyed in the industry.

The principal monomers of our copolymer three dimensional siloxane coating are tetraethyl orthosilicate and certain combinations of methyltrimethoxy silane, methyltriethoxysilane, ethyltrimethoxysilane, ethyltriethoxysilane, dimethyldimethoxysilane and dimethyldiethoxysilane. For example, useful abrasion resistant coatings for both polycarbonate and diethylene glycol bis-(allyl carbonate) are prepared by reacting 40 to 70 weight percent tetraethyl orthosilicate and 60 to 20 weight percent of methyltrimethoxysilane to form a highly-crosslinked polysiloxane network polymer. By allowing these monomers to hydrolyze in-situ by addition of water to the alcohol solution, the polymer will form a tough abrasion resistant coating when applied to the surface of a lens and then allowed to crosslink and cure by the application of heat either in the presence or absence of a catalyst. When the substrate to be coated is one which will absorb water under humid conditions, e.g. poly diethylene glycol bis(allyl carbonate) and cellulose acetate propionate, less tetraethyl orthosilicate is preferred. Suitable coatings for these substrates are obtained from the reaction of about 35 to 45 weight percent tetraethyl orthosilicate, about 45 to 55 weight percent methyltrimethoxy silane and about 5 to 15 weight percent 3-glycidoxypropyltrimethoxysilane.

In addition to the discovery of these new abrasion resistant coatings, we have also discovered how to render them suitable for dyeing once they have been applied to and cured upon the surface of a lens. Since highly crosslinked polysiloxanes are rather impervious to attack by most coloring agents, we have developed two techniques to modify their properties so that organic dyes will penetrate the coating and will be adsorbed within the molecular structure.

The first technique involves the addition of certain surfactants or wetting agents to the coating formulation. For example, the addition of a non-ionic wetting agent such as Triton X-100, a polyethylene oxide derivative of nonylphenol made by Rohm & Haas Company, permits conventional ophthalmic organic dyes to penetrate into the coating. Another useful wetting agent is Fluorad FC-430, a non-ionic fluorinated alkyl ester made by the 3M Company. Coatings prepared with this material also permitted organic dyes to penetrate into the coating.

A second approach is the use of up to 20 weight percent of a reactive siloxane monomer with polar sites that serve to attract the organic dyes. Typical reactive siloxane monomers are:

3-chloropropyltrimethoxysilane
3-glycidoxypropyltrimethoxysilane
3-methacryloxypropyltrimethoxysilane
bis(2-hydroxyethyl)aminopropyltrimethoxysilane
and (3,4-epoxycyclohexyl)ethyltrimethoxysilane These monomers are reacted with the basic tetraethyl orthosilicate/silane coating formulation as shown in the examples to yield dyeable lens coatings. When these monomers are used and if they are considered as part of the "silane" component of the basic tetraethyl orthosilicate/silane mixture, the silane component must be present in a total of at least 30 weight percent.

EXAMPLE 1

208 grams of tetraethyl orthosilicate, 136 grams of methyltrimethoxysilane were hydrolyzed in 95 grams of alcohol (50% isopropanol, 50% n-butanol), 130 grams of water, 30 grams of acetic acid, and 14 drops of hydrochloric acid using an ice bath for 10 minutes to control the initial exotherm, and then at room temperature overnight.

Polycarbonate lenses were primed by dipping for one minute in a solution containing 10% gamma-amino propyl triethoxysilane, 85% ethyl alcohol and 5% water, rinsed, air dried and then dip-coated in the abrasion-resistant coating solution and cured at 104° C. for 8 hours. The resulting coatings were on the average of 2 microns thick and resistant to abrasion and solvent attack.

EXAMPLE 2

50 grams of methyltrimethoxysilane, 50 grams of tetraethyl orthosilicate, were hydrolyzed in 40 grams of 50/50 weight % solution of isopropanol and n-butanol by stirring constantly while 35 grams of water and 10 grams of acetic acid were added dropwise. The solution was aged for 1 day.

Polycarbonate (primed as in Example 1) and CR-39 (hydrolized) lenses were dip-coated with the abrasion-resistant coating solution and cured at 104° C. for 8 hours. The resulting coatings were on the average 2 microns thick and quite resistant to abrasion and solvent attack.

EXAMPLE 3

100 grams of methyltrimethoxysilane, 100 grams of tetraethyl orthosilicate, and 80 grams of 50/50 isopropanol-n-butanol were mixed while 70 grams of water and 20 grams of acetic acid were slowly added.

After aging the solution overnight, it was divided into seven 50 gram batches to which 0, 0.1, 0.25, 0.50, 1.00, 2.50, and 5.00% Triton X-100 was added, respectively.

Primed polycarbonate lenses were coated from each solution and cured at 220° F. for 8 hours. The resulting coatings were 2-3 microns in thickness. They were dyed by dipping in an organic dye (ophthalmic grey from Brain Power Inc.) mixed with water. Visual transmission of the lenses after 5 minutes of dyeing at 200° F. were 87%, 88%, 88%, 86%, 84%, 62% and 25%, respectively.

EXAMPLE 4

To 50 grams of coating solution as prepared in Example 3 above, was added 2% Fluorad FC-430. Primed polycarbonate lenses were coated and cured as above. The coating again accepted the organic dye to give a visual transmission of 56% after 5 minutes at 200° F. in the water dye mixture.

EXAMPLE 5

24 grams of tetraethyl orthosilicate, 12 grams of methyltrimethoxysilane, 4 grams of 3-methacryloxypropyltrimethoxysilane, were hydrolyzed in 19 grams of 50/50 isopropanol-n-butanol by slowly adding 12.5 grams of water and 3.75 grams of acetic acid. The solution was aged three days.

Primed polycarbonate lenses were coated and cured as in previous examples. The coating was receptive to conventional ophthalmic organic dyes. Visual transmission equaled 76% after 5 minutes at 200° F. in the aqueous/dye (BPI Grey) mixture.

EXAMPLE 6

24 grams of tetraethyl orthosilicate, 12 grams of methyltrimethoxysilane, and 6.45 grams of bis(2-hydroxyethyl) aminopropyltriethoxysilane, were hydrolyzed in 16 grams of 50/50 alcohol by adding 12.75 grams of water and 3.75 grams of acetic acid slowly. The pH was the adjusted to 3 with hydrochloric acid.

Coated polycarbonate lenses again were quite receptive to the 5 minute dye treatment at 200° F. in the aqueous mixture of BPI Grey. The lenses had a transmission of 74%.

EXAMPLE 7

344 grams of tetraethyl orthosilicate, 430 grams of methyltrimethoxysilane and 86 grams of 3-glycidoxypropyltrimethoxysilane were hydrolyzed by slowly adding 310 grams of a 50/50 mixture of isopropyl alcohol and butyl alcohol, 310 grams of water and 69 grams of acetic acid at a rate that permitted the reaction to proceed without exceeding 30° C. The coating solution should be aged about 4 days before use and has useful pot life of approximately 4 to 6 weeks.

Hydrolyzed CR-39 ophthalmic lenses were coated by dipping in the aged coating solution and withdrawing them from the solution at a rate of about 10 inches per minute. The coating obtained was about 2 to 3 microns thick; had good adhesion to the lenses; passed cycle humidity, boiling water and abrasion tests as well as enhanced the impact resistance of the lenses.

What is claimed is:

1. A coating composition which is curable to provide an optically clear abrasion resistant coating, which comprises a hydrolysis product of about 35 to 45 weight percent tetraethyl orthosilicate and 55 to 45 weight percent methyltrimethoxysilane, and 5 to 15 weight percent 3-glycidoxypropyltrimethoxysilane.

2. The coating composition according to claim 1 wherein about 40 weight percent tetraethyl orthosilicate and about 50 weight percent methyltrimethoxysilane and 10 weight percent 3-glycidoxypropyltrimethoxysilane were hydrolyzed with a mixture of water, alcohol and acetic acid and then aged.

3. An ophthalmic lens coated with the composition of claim 1.

* * * * *